G. NICHOLS.
Running-Gear.
No. 80. Reissued Mar. 14, 1846.
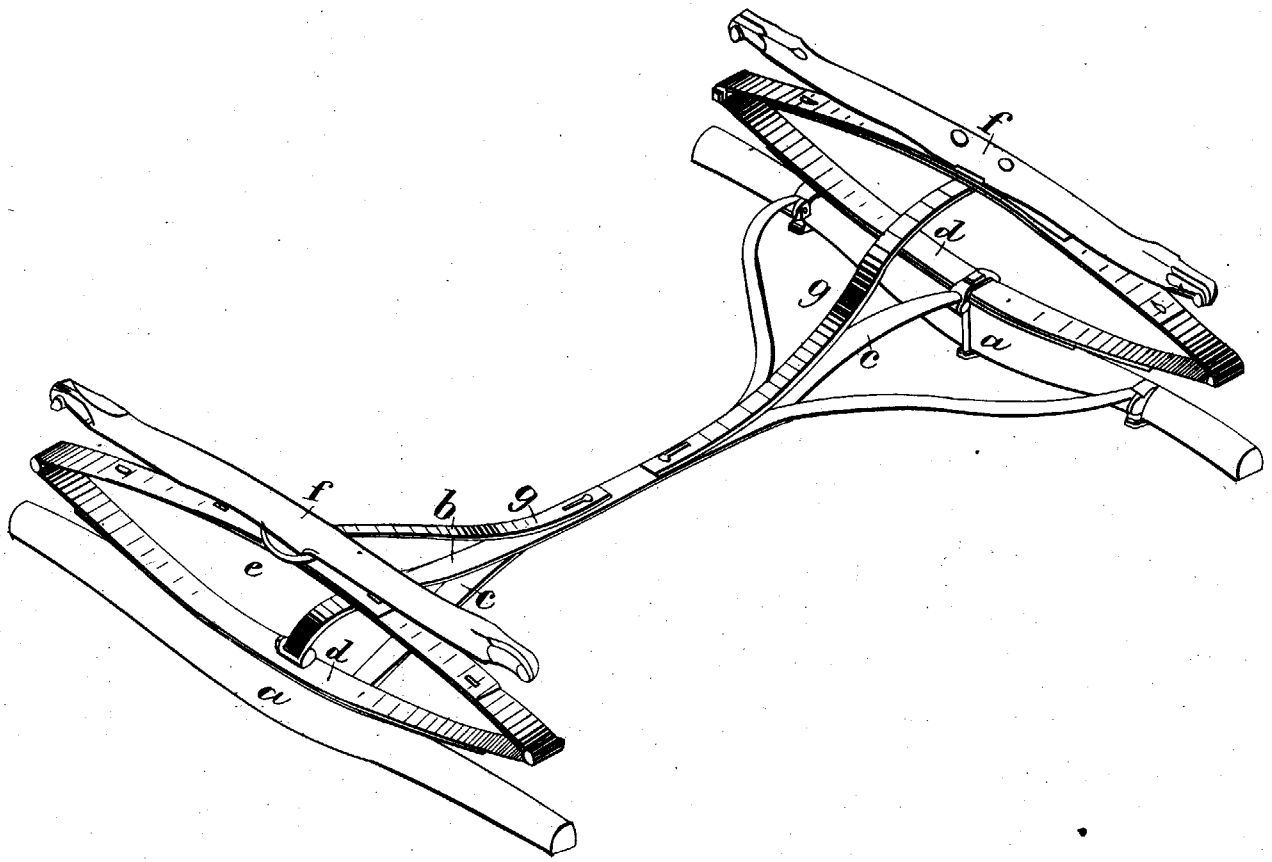
N. PETERS, PHOTO-LITHOGRAPHER, WASHINGTON, D. C.

UNITED STATES PATENT OFFICE.

GEORGE NICHOLS, OF TRUMBULL, CONNECTICUT.

IMPROVEMENT IN THE MANNER OF CONNECTING THE BODY OF A CARRIAGE WITH THE PERCH BY MEANS OF SPRINGS.

Specification forming part of Letters Patent No. 3,527, dated April 10, 1844; Reissue No. 80, dated March 14, 1846.

*To all whom it may concern:*

Be it known that I, GEORGE NICHOLS, of Trumbull, in the county of Fairfield and State of Connecticut, have invented a new and useful Improvement in the Running-Gear of Carriages; and I do hereby declare that the following is a full, clear, and exact description of the principle or character thereof which distinguishes it from all other things before known, and of the manner of making, constructing, and using the same, reference being had to the accompanying drawing, making part of this specification, which is an isometrical view of one modification thereof.

The nature of my invention consists in affixing to the perch of a carriage (constructed of wood, steel, or other metal of any convenient form) two spring stay-braces that extend from the spring-bars front and back down to the center of the perch, where they are so attached as to slide on the perch as the other end works up and down. This is effected either by bolts that pass through slots in the ends of the stay-braces, as shown in the figure, by shackles, or any other method substantially the same.

The construction is as follows: The axles *a* and perch *b* are made in any convenient form, and are stayed, as at *c*. To the top of the axles are bolted common elliptic springs, *d*, and above the forward one the fifth-wheel *e* is placed. Upon both these springs spring-bars *f* are fastened. From the center of the perch a narrow bar, *g*, of spring-steel, curves up to the back spring-bar, to which or to the spring it is connected by a suitable joint. This forms the back spring stay-brace. A similar one extends up to the forward spring or bar, and is then attached for the forward spring stay-brace. They are both connected with the perch at its center, so as to slide thereon, by means of bolts that project from the perch, passing through slots cut in them, on which they slide, or by any device which will effect the same object—viz., that of allowing the ends to rise and fall without straining out the spring-bars, and giving free action to the springs.

I do not claim connecting the body of a carriage with the perch by means of longitudinal springs, as that has already been done; but What I do claim as my invention, and desire to secure by Letters Patent, is—

The combination of the spring stay-braces *g* with the perch, either by means of bolts passing through slots in the ends of said braces in contact with the perch or by any other analogous device, so as to allow said braces to move thereon, substantially in the manner and for the purpose herein described.

GEORGE NICHOLS.

Witnesses:
AUGUSTUS JENNINGS,
A. P. BROWNE.